United States Patent [19]
Yoshinobu et al.

[11] Patent Number: 5,777,605
[45] Date of Patent: Jul. 7, 1998

[54] COORDINATE INPUTTING METHOD AND APPARATUS, AND INFORMATION PROCESSING APPARATUS

[75] Inventors: Hitoshi Yoshinobu, Kanagawa; Masahiro Nakano, Tokyo; Kazuhiro Akaike, Kanagawa, all of Japan

[73] Assignee: Sony Corporation, Tokyo, Japan

[21] Appl. No.: 647,044

[22] Filed: May 9, 1996

[30]     Foreign Application Priority Data

May 12, 1995  [JP]  Japan .................... 7-113483

[51] Int. Cl.$^6$ ............................................. G09G 3/00
[52] U.S. Cl. ............................. 345/173; 345/174; 345/179; 345/157; 463/37; 178/18
[58] Field of Search .................. 364/236.8, 705.03; 345/156, 145, 157, 158, 173–179, 169; 178/18, 19; 273/148 B; 463/37, 39; 341/22; 348/734

[56]           References Cited

U.S. PATENT DOCUMENTS

| 4,988,982 | 1/1991 | Rayner et al. ................. 341/22 |
| 5,025,410 | 6/1991 | Morita ............................ 364/236.8 |
| 5,134,689 | 7/1992 | Murakami et al. ............. 345/177 |
| 5,231,380 | 7/1993 | Logan ........................... 341/22 |
| 5,424,756 | 6/1995 | Ho et al. ........................ 345/158 |

*Primary Examiner*—Lun-Yi Lao
*Attorney, Agent, or Firm*—Frommer Lawrence & Haug LLP; William S. Frommer

[57]            ABSTRACT

The invention provides a method and apparatus for inputting coordinate information in which a relative coordinate mode and an absolute coordinate mode is automatically switched depending on a contact area. If a tablet is operated with a finger or a pen, a detection circuit detects the contact area. If the contact area is greater than a predefined threshold value, a signal corresponding to the relative coordinates of the point P at which the finger or the pen is contact with the tablet is output. If the contact area is equal to or smaller than the predefined threshold value, a signal corresponding to the absolute coordinates of the point P is output. The above output signal is supplied to a transmission module. The transmission module performs frequency modulation on the received signal and transmits the resultant signal via a transmission antenna. There are also provided buttons used for clicking operations. If a power switch is turned on, a power supply voltage is supplied from a battery via a power supply circuit.

11 Claims, 16 Drawing Sheets

COORDINATE INPUTTING METHOD AND APPARATUS, AND INFORMATION PROCESSING APPARATUS

FIELD OF THE INVENTION

The present invention relates to a method and apparatus for inputting a coordinate, and to an information processing apparatus. More specifically, the present invention relates to a method and apparatus for inputting a coordinate thereby remote-controlling a television receiver or the like, and to a relating information processing apparatus.

BACKGROUND OF THE INVENTION

In recent years, many AV (audio video) apparatus or systems are designed to be remote-controlled by a remote commander. The remote commander is usually provided with buttons corresponding to various functions of an AV apparatus to be controlled. If one of these button switches is selected and operated, a command corresponding to a function assigned to the selected button is sent from the remote commander to the AV apparatus. Upon the reception of the command, the AV apparatus performs an operation corresponding to the received command.

However, if button switches are disposed on a remote commander in such a manner that each function has its own corresponding button switch, the number of button switches increases with the number of functions. This makes it difficult for a user to select a desired button switch. Furthermore, the remote commander needs a great size to accommodate such the great number of button switches.

One known technique to solve the above problem is to employ an OSD (on screen display) technique in conjunction with a remote commander. In this technique, a user selects a desired function from a menu displayed on the screen of a display device in such a manner that a user moves a cursor displayed on th e screen by operating the remote commander and selects a desired icon displayed on the screen thereby inputting a corresponding command.

The remote commanders can be grouped into two types in terms of the coordinates output by the remote commander to move the cursor: a relative coordinate type, and absolute coordinate type.

The remote commanders of the relative coordinate type can further be divided into several types according to the means for inputting a coordinate. These means include a direction specifying button or pad, mouse, track ball, joy stick, and gyroscope. Furthermore, particularly in recent years, means of detecting a change in capacitance such as Glide Point (trade mark of Cirque Co.) is also employed.

Also in the remote commanders of the absolute coordinate type, various techniques are possible as the means of inputting a coordinate. One technique is to directly touch a screen as employed in a touch panel. Another technique is to employ a tablet for inputting a coordinate by means of an electromagnetic induction detection mechanism, a capacitance detection mechanism, or a pressure detection mechanism. These means are implemented in a flat form such as a plate.

The configurations of the relative coordinate type and of the absolute coordinate type have their own advantages and disadvantages. One disadvantage of the absolute coordinate type is its great size compared with the size of the relative coordinate type. This arises from a requirement that the ratio of the size of the input tablet or plate to the size of the display screen should be as close as 1:1 so that the operation of inputting a coordinate can be performed in a natural manner although there may remain some parallax.

Furthermore, if the spacing between icons decreases with the increasing number of icons displayed on the screen, higher accuracy is required in detection of coordinates. This results in an increase in the size of the detecting device and results in an increase in the cost. Thus, the disadvantage of the absolute coordinate type is two-fold.

On the other hand, in the absolute coordinate type, it is also possible to output a relative coordinate using the same detection mechanism for inputting a coordinate depending on a decision. For example, it is possible to convert the motion of a finger or pen over a tablet into relative coordinates and then output the result.

In some applications of receiving apparatus, it is difficult to correctly give a command corresponding to a desired function by means of a relative coordinate operation and thus an absolute coordinate operation is essentially required. For example, it is difficult, although not impossible, to draw a picture or write a signature with a mouse or a joy stick.

As can be seen from the above discussion, when an application of a receiving apparatus needs information given in the form of absolute coordinates, the inputting apparatus which outputs absolute coordinates has a large size and is expensive.

However, when the application requires inputting of absolute coordinates only within a certain limited frame or window on a display screen, an inputting plate having a size similar to the frame or window is sufficient for the purpose. In this case, the overall size of the remote commander equipped with this plate does not become significantly great. If the size of the plate is greater than the frame or window displayed on the screen, the size ratio becomes different from the above-described optimum value or 1:1, and thus the inputting operation becomes unnatural.

The present invention offers a technique to solve the above problems. More specifically, the invention provides an improved method and apparatus for inputting a coordinate, in which the coordinate inputting may be easily switched between a relative coordinate mode and an absolute coordinate mode without giving a user an unnatural feeling wherein the method and apparatus can be realized without causing an increase either in the size of a remote commander or in the cost.

SUMMARY OF THE INVENTION

Thus, it is an object of the present invention to provide an improved method and apparatus for inputting a coordinate.

It is another object of the present invention to provide an improved information processing apparatus.

According to an aspect of the invention, there is provided a coordinate inputting apparatus for inputting a coordinate with a finger or a pen, the apparatus including: operation means which is operated by the finger or pen; position detecting means for detecting a pressed position of the operation means pressed by the finger or pen; area detecting means for detecting the pressed area of the operation means pressed by the finger or pen; comparison means for comparing the pressed area detected by the area detecting means with a predefined reference value; and output means for outputting relative coordinate information corresponding to the movement of the pressed position detected by the position detecting means or absolute coordinate information corresponding to the pressed position detected by the position detecting means wherein whether relative coordinate information or absolute coordinate information is output is determined on the basis of the comparison result given by the comparison means.

According to another aspect of the invention, there is provided an information processing apparatus for performing a predetermined process according to the coordinate input with a finger or a pen, the apparatus including: operation means which is operated with the finger or pen; position detecting means for detecting a pressed position of the operation means pressed by the finger or pen; area detecting means for detecting the pressed area of the operation means pressed by the finger or pen; comparison means for comparing the pressed area detected by the area detecting means with a predefined reference value; output means for outputting relative coordinate information corresponding to the movement of the pressed position detected by the position detecting means or absolute coordinate information corresponding to the pressed position detected by the position detecting means wherein whether relative coordinate information or absolute coordinate information is output is determined on the basis of the comparison result given by the comparison means; transmission means for transmitting said relative coordinate information or absolute coordinate information given by the output means; reception means for receiving the relative coordinate information or absolute coordinate information transmitted by the transmission means; display means for displaying characters, graphic patterns, or icons corresponding to predefined functions; selection means for selecting one of the functions displayed on the display means on the basis of the relative coordinate information received via the reception means; and processing means for displaying a character or a graphic pattern on the display means according to the absolute coordinate information received via the reception means.

DESCRIPTION OF THE PREFERRED EMBODIMENTS

Figure 1:
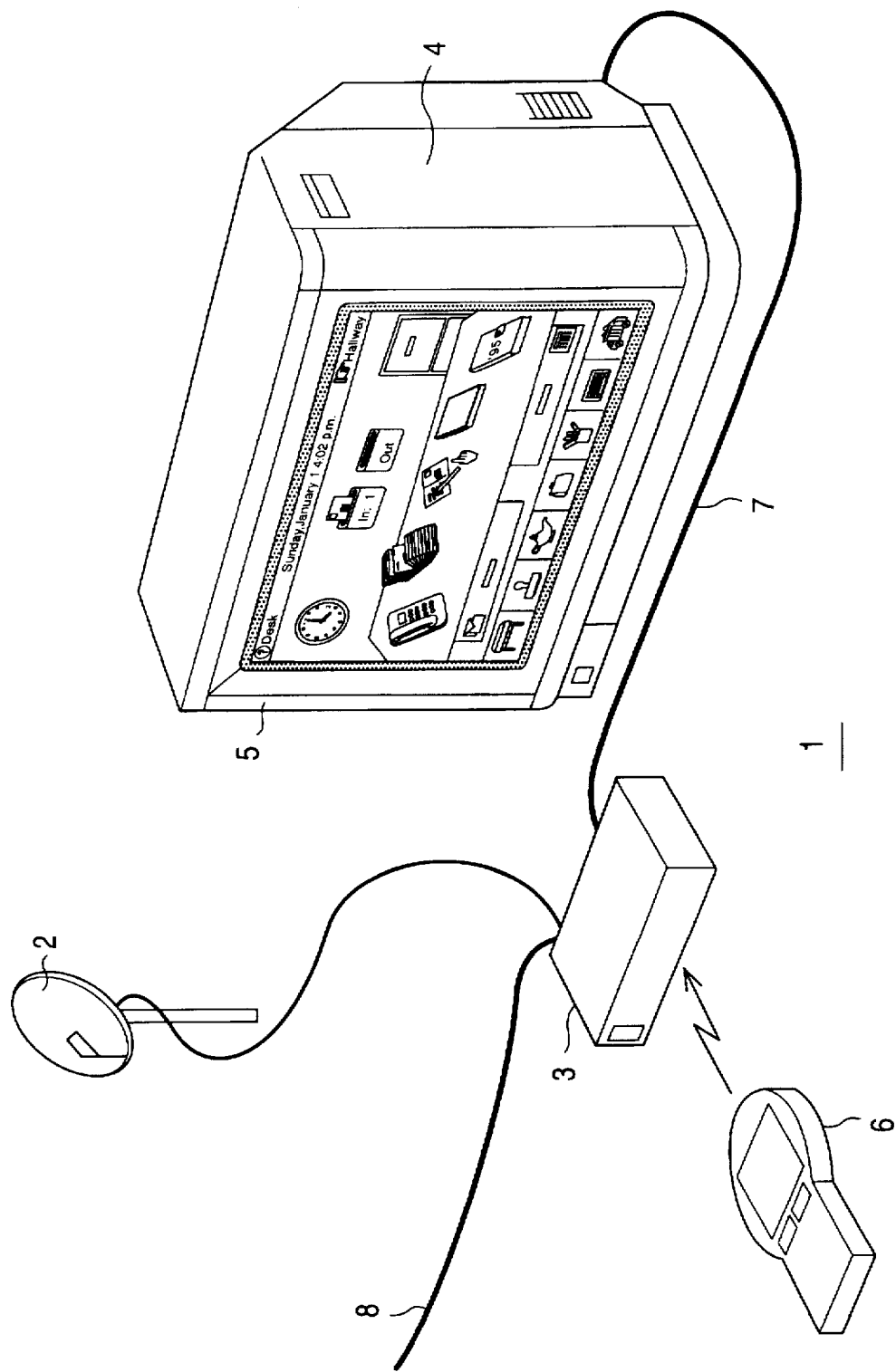
FIG. 1 is a schematic diagram illustrating an AV system according to the present invention.

FIG. 1 illustrates an embodiment of an AV (audio video) system according to the present invention. In this specific embodiment, the AV system 1 includes a set top box 3 for demodulating a signal received from a satellite (a broadcasting satellite or a communication satellite) via a parabolic antenna 2 and also includes a monitor device 4. The monitor device 4 is connected to the set top box 3 via an AV line 7.

There is also provided a remote commander 6 for inputting a command to the set top box 3 by transmitting the command via a radio wave or the like. As will be described later, if the remote commander 6 is operated with a finger or a pen, a radio wave signal corresponding to the operation is transmitted from a transmission antenna (transmission means, refer to FIG. 4) 66, and the radio wave is received by a receiver unit (receiving means, refer to FIG. 2) 35 of the set top box 3.

A telephone line 8 is connected to the set top box 3 so that desired information is transmitted or received via the telephone line 8.

Figure 2:
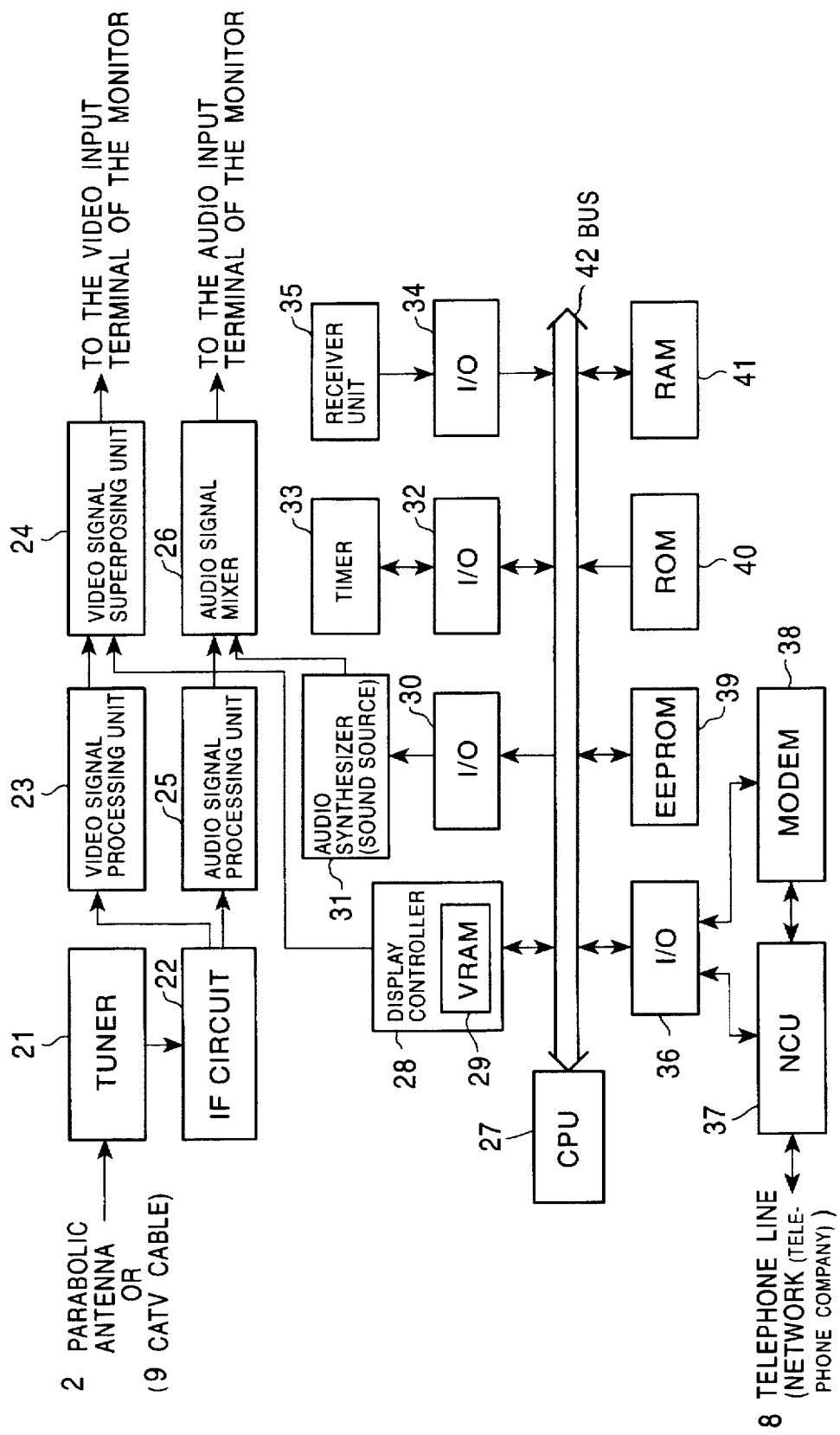
FIG. 2 is a block diagram illustrating a circuit configuration of the set top box used in the system shown in FIG. 1.

FIG. 2 illustrates the internal structure of the set top box 3 shown in FIG. 1. The signal received via the parabolic antenna 2 is sent to a tuner 21, which in turn extracts a signal corresponding to a selected channel and outputs it to an intermediate frequency (IF) circuit 22. The IF circuit 22 converts the signal corresponding to the selected channel received from the tuner 21 to an intermediate frequency signal. A video signal is extracted from the intermediate frequency signal and supplied to a video signal processing unit 23. An audio signal is also extracted from the intermediate frequency signal and supplied to an audio signal processing unit 25.

The video signal processing unit 23 amplifies the video signal supplied by the IF circuit 22 and converts it into an RIB signal. The audio signal processing unit 25 amplifies the audio signal supplied by the IF circuit 22, and outputs the resultant signal.

A ROM 40 stores a program which is used by a CPU (selection means, processing means) 27 to perform various processes and also to control various parts of the apparatus via a bus 42. A RAM 41 stores data used by the CPU 27 during various operations.

An EEPROM 39 stores data which is required to be kept after the power of the apparatus is turned off. Under the control of the CPU 27, a VRAM (video RAM) 29 in a display controller 28 stores data representing characters, graphic patterns, and icons. The display controller 28 converts the data stored in the VRAM 29 to a RIB signal, and outputs the resultant signal.

The display controller 28 also transmits and receives information to and from the outside via a telephone line using an NCU (network control unit) 37 or a modem 38 connected to an I/O 36. An audio synthesizer (sound source) 31 synthesizes an audio signal according to sound data supplied via an I/O 30 and outputs the resultant signal.

A timer 33 counts the elapse of time, and outputs a predetermined signal via an I/O 32 at a predetermined time. The receiver unit 35 receives the radio wave emitted by the remote commander 6 and supplies a signal corresponding to the received radio wave to the CPU 27 via an I/O 34.

A video signal superimposing unit 24 superimposes the video signal supplied by the video signal processing unit 23 on the video signal supplied by the display controller 24 and sends the resultant signal to the video input terminal (not shown) of the monitor device 4. An audio signal mixer 26 combines the audio signal supplied by the audio signal processing unit 25 and the audio signal from the audio synthesizer, and sends the resultant signal to the audio input terminal (not shown) of the monitor device 4.

Figure 3:
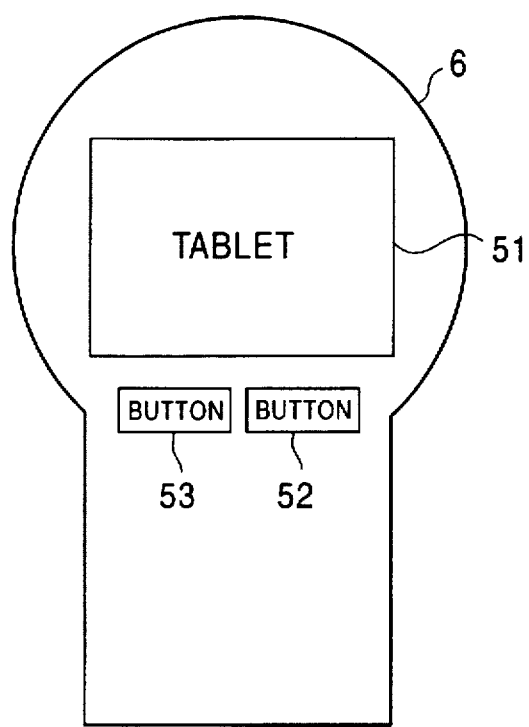
FIG. 3 is a schematic diagram illustrating the appearance of the remote commander 6 shown in FIG. 1.

FIG. 3 illustrates an example of a remote commander 6. A tablet (operation means) 51 is used to input a relative or absolute coordinate wherein the inputting of the coordinate is performed by pressing the tablet with a finger or a pen. Buttons 52 and 53 are used to supply a predefined command to the set top box 3. If the tablet 51, the button 52, or the button 53 is operated, a radio wave signal corresponding to the operation is transmitted.

Figure 4:
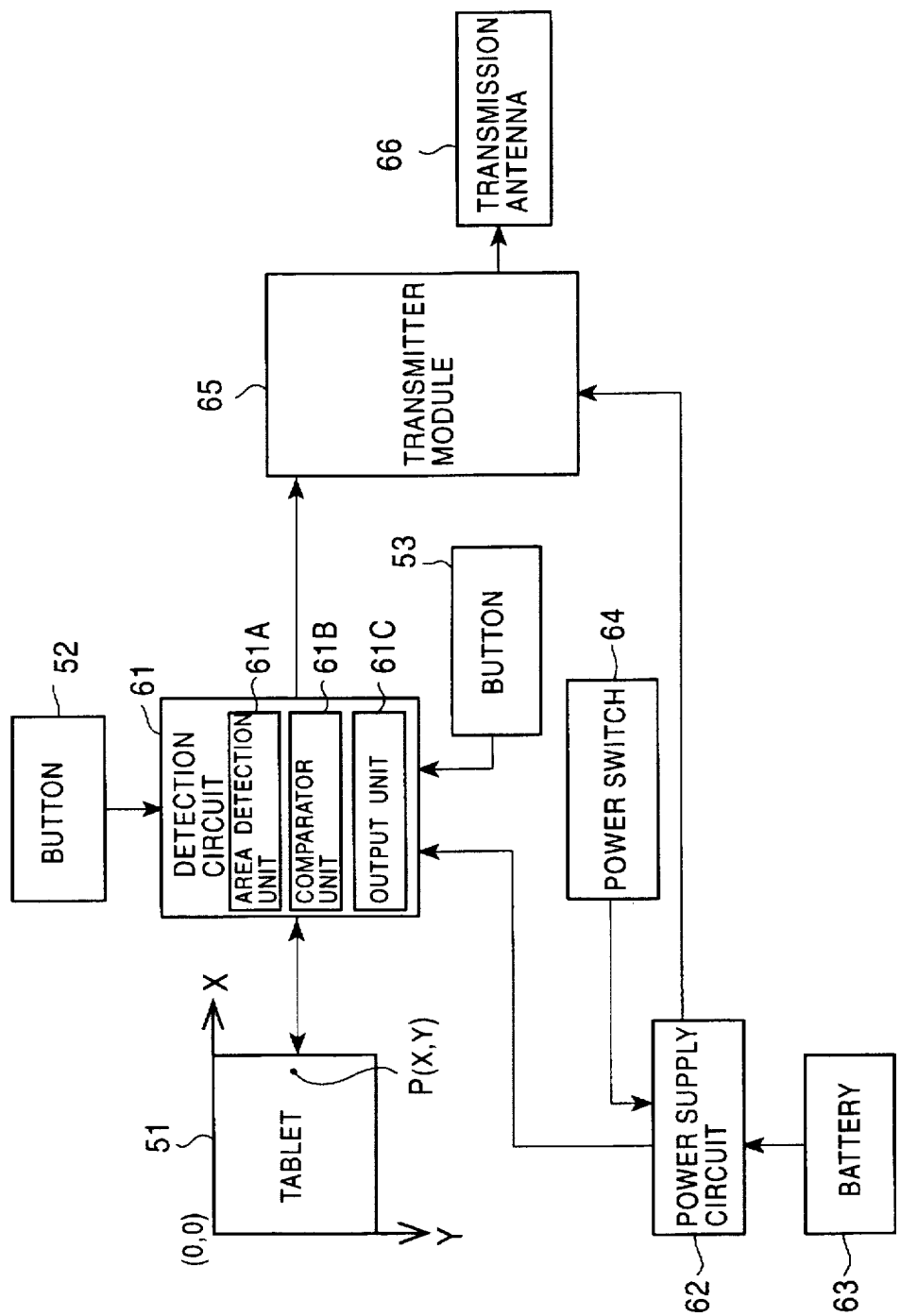
FIG. 4 is a block diagram illustrating the internal structure of the remote commander 6 shown in FIG. 3.

FIG. 4 is a block diagram illustrating an example of the electric circuit of the remote commander 6. In response to the operation of the tablet 51, a change occurs in the capacitance of the tablet 51, and the capacitance change is input to a detection circuit (position detecting means) 61. The detection circuit 61 detects the contact position on the basis of the input signal associated with the change in the capacitance. The detection circuit 61 includes: an area detection unit (area detecting means) 61A for detecting the contact area of a tablet 51 in contact with a pen or pen; a comparator unit (comparison means) 61B for comparing the contact area with a reference value; and an output unit (output means) 61C for outputting a relative or absolute coordinate according to the comparison result. The signals output by the buttons 52 and 53 are also input to the detection circuit 61. Upon the reception of the signal from the button 52 or 53, the detection circuit 61 generates a signal corresponding to the input signal and outputs the generated signal to a transmission module 65. The transmission module 65 performs frequency modulation on the signal received from the detection signal 61, and transmits a radio wave corresponding to the resultant signal via the transmission antenna 66.

If a power switch 64 is turned on, a power supply circuit 62 generates an increased voltage from a voltage supplied by a battery 63 and supplies the resultant voltage to the detection circuit 61 and the transmission module 65.

Figure 5:
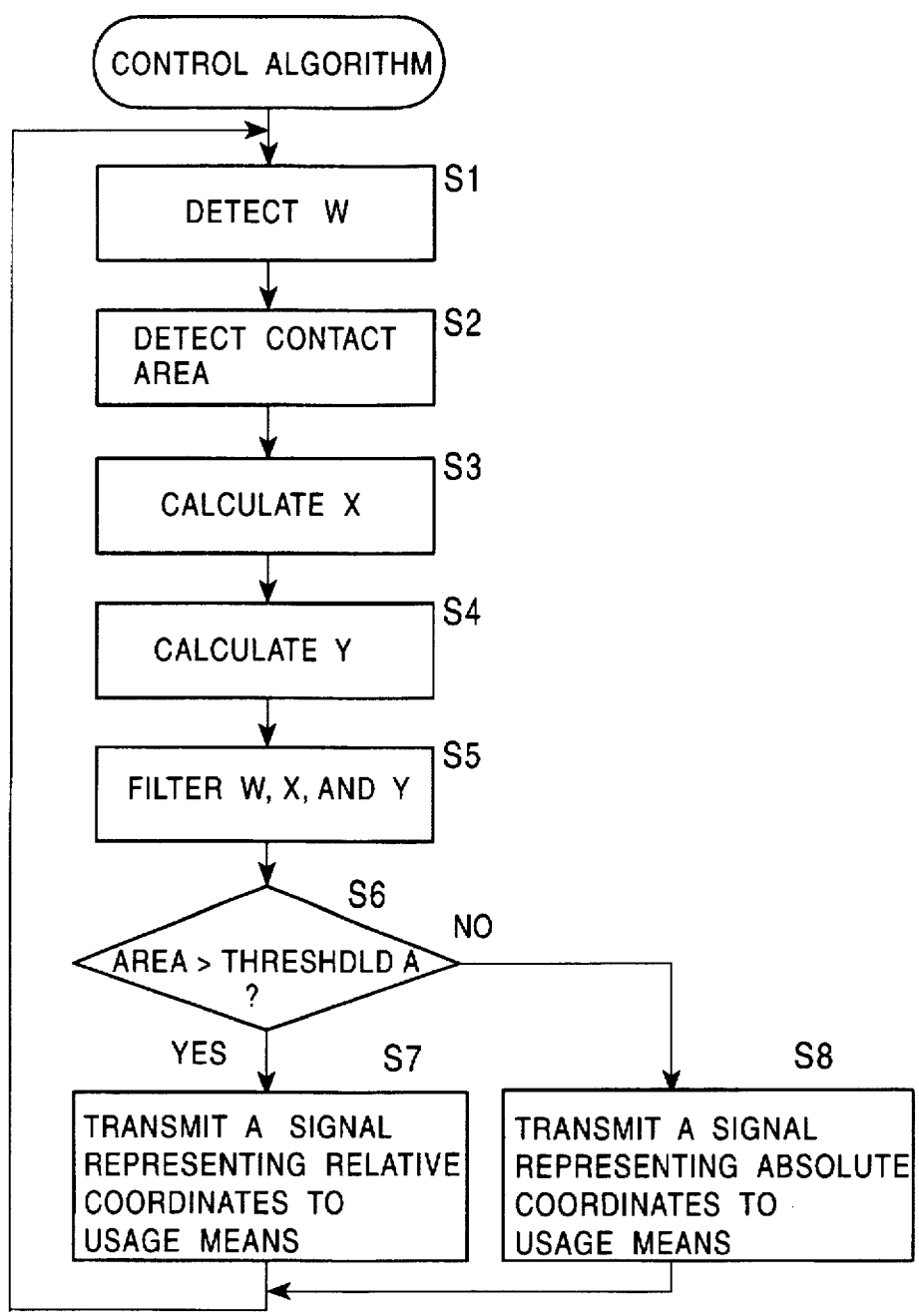
FIG. 5 is a flow chart illustrating the process associated with the remote commander 6.

The control algorithm of the remote commander 6 will be described below with reference to the flow chart of FIG. 5. In a first step S1, the detection circuit 61 detects the distance W between the tablet 51 and a finger or pen approaching the tablet 51.

Figure 6:
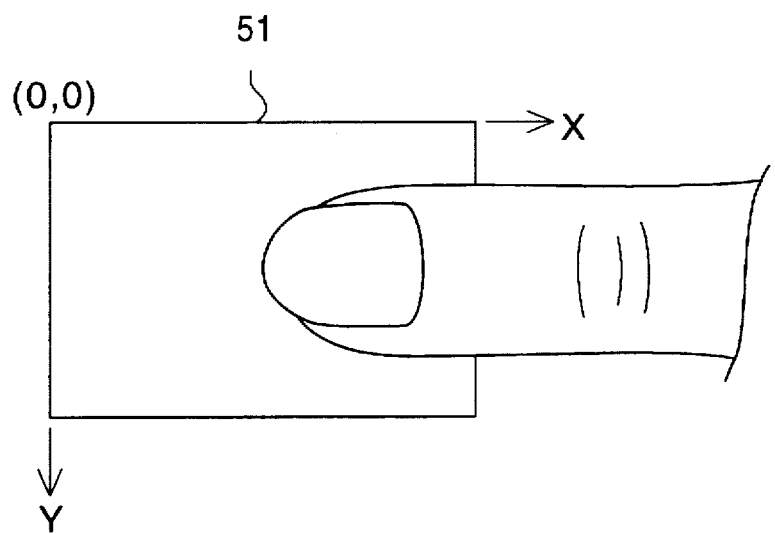
FIG. 6 is a schematic diagram illustrating the operation of the tablet of the remote commander with a finger.
Figure 7:
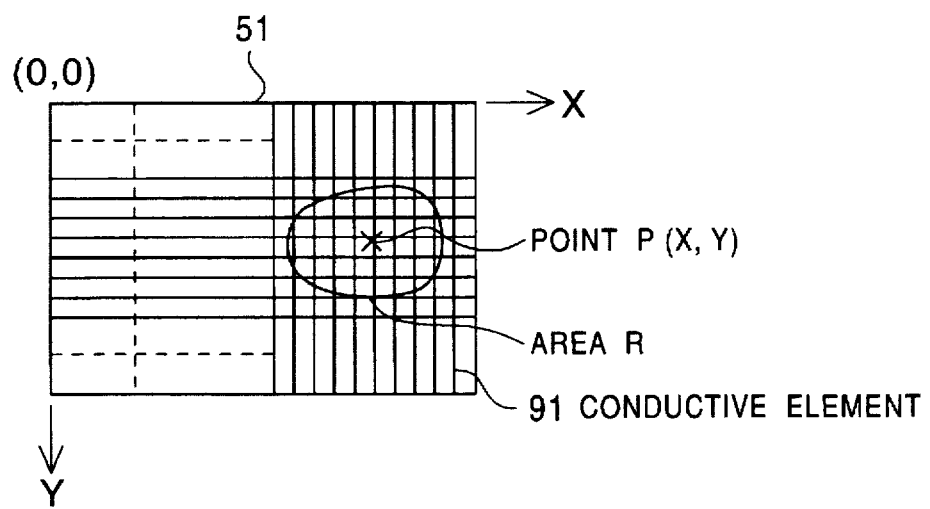
FIG. 7 is a schematic diagram illustrating the internal structure of the tablet wherein a contact area at which a finger is in contact with the tablet and its center point are also shown.

In step S2, the area detection unit 61A of the detection circuit 61 determines which part of the tablet the finger or pen is in contact with and further detects the contact area. That is, if a certain part of the tablet 51 is operated (pressed) by a user with a finger or a pen as shown in FIG. 6, there occurs a change in capacitance associated with conductive elements 91 (a great number of conductive elements are arranged at intervals much smaller than the size of a finger) in a contact area R at which the finger is in contact with the tablet 51. The change in capacitance is detected by the detection circuit 61.

The process then goes to step S3 in which the detection circuit 61 calculates the X component of the absolute coordinates of the center point P of the area R. Then in step S4, the detection circuit 61 calculates the Y component of the absolute coordinates of the center point P of the area R.

In step S5, the detection circuit 61 filters signals including the signal corresponding to the distance W between the finger and the tablet 51, the signal corresponding to the contact area at which the finger is in contact with the tablet 51, and the signals corresponding to the X and Y components of the absolute coordinates of the point P or of the finger position on the tablet 51.

Then in step S6, the detection circuit 61 determines whether the contact area is greater than a predefined threshold A. If it is concluded that the contact area is greater than the threshold A, which will occur for example when the tablet 51 is operated with a finger having a rather great size, then the process goes to step S7 in which the detection circuit 61 detects the relative coordinates of the point P. Then a signal corresponding to the contact area detected in the earlier step and a signal corresponding to the relative coordinates of the point P are supplied to the transmission module 65 by the output unit 61C.

For example, when the finger is moved over the tablet, the relative coordinates are represented by the difference between the coordinates of a finger position on the tablet 51 at a certain time and the coordinates after a certain amount of time has elapsed. The signals supplied to the transmission module 65 are converted to frequency-modulated signals, and corresponding radio wave signals are transmitted via the transmission antenna 66 to usage means which is to use the signals, that is the set top box 3 in the case of the present embodiment.

On the other hand, if it is concluded that the contact area is equal to or smaller than the threshold A, which will occur for example when the tablet 51 is operated with a pen having a small contact area, then the process goes to step S8 in which the detection circuit 61 detects the absolute coordinates of the point P. Then a signal corresponding to the contact area detected in the earlier step and a signal corresponding to the absolute coordinates of the point P are supplied to the transmission module 65 by the output unit 61C. The signals supplied to the transmission module 65 are converted to frequency-modulated signals, and corresponding radio wave signals are transmitted via the transmission antenna 66 to the usage means which is to use the signals, that is the set top box 3 in this case.

As described above, the remote commander 6 transmits the signal representing the coordinates corresponding to the point P of the finger or pen position on the tablet 51 wherein the coordinate output mode is automatically switched between the absolute coordinate mode and the relative coordinate mode depending on whether or not the area at which the finger or pen is in contact with the tablet 51 is greater than the predefined reference value. Therefore, for example when an icon displayed on a CRT (display means) 5 is selected with a cursor, the tablet 51 is operated with a finger having a rather great contact area, and the cursor is moved in response to the given relative coordinates. In this case, the ratio of the actual moving distance of the finger over the tablet 51 to the corresponding moving distance of the cursor on the CRT 5 can be increased or decreased to a desired value.

On the other hand, when it is desired to write a character or draw a picture using the cursor, the tablet 51 is operated using a pen having a rather small contact area, and the cursor is moved in response to the given absolute coordinates. In this case, the ratio of the moving distance of the pen to the corresponding moving distance of the cursor can be set to 1:1 so that a user can write a character or draw a picture in a natural manner.

Figure 8:
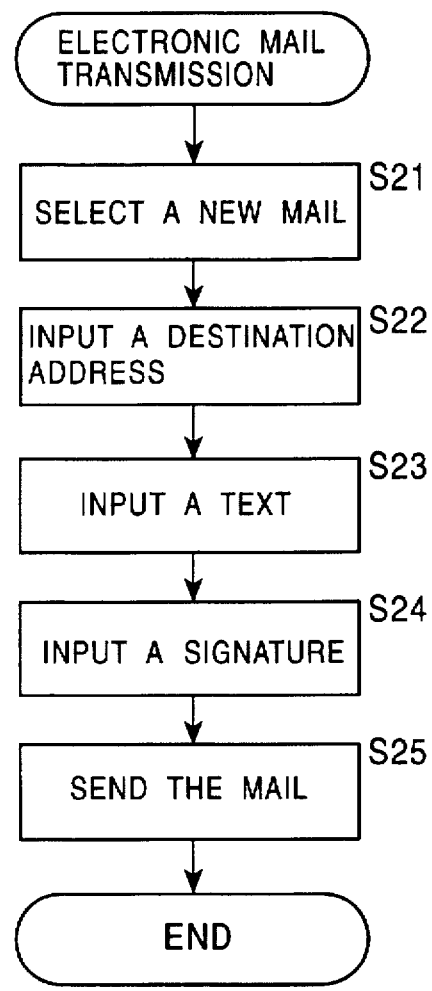
FIG. 8 is a flow chart illustrating a process of transmitting an electronic mail.

FIG. 8 is a flow chart illustrating the process of transmitting an electronic mail by operating the above-described remote commander 6 thereby sending a command to the set top box 3. In this specific example, it is assumed that the electronic mail is sent via the Personal Link Services provided by AT&T. The Personal Link Services are communication services with the Telescript in which services of electronic mails including graphic, animation, sound, and text information, and news distribution services are available. Agent services are also available in which a desired operation is performed for a user according to a program written in the Telescript language.

Figure 9:
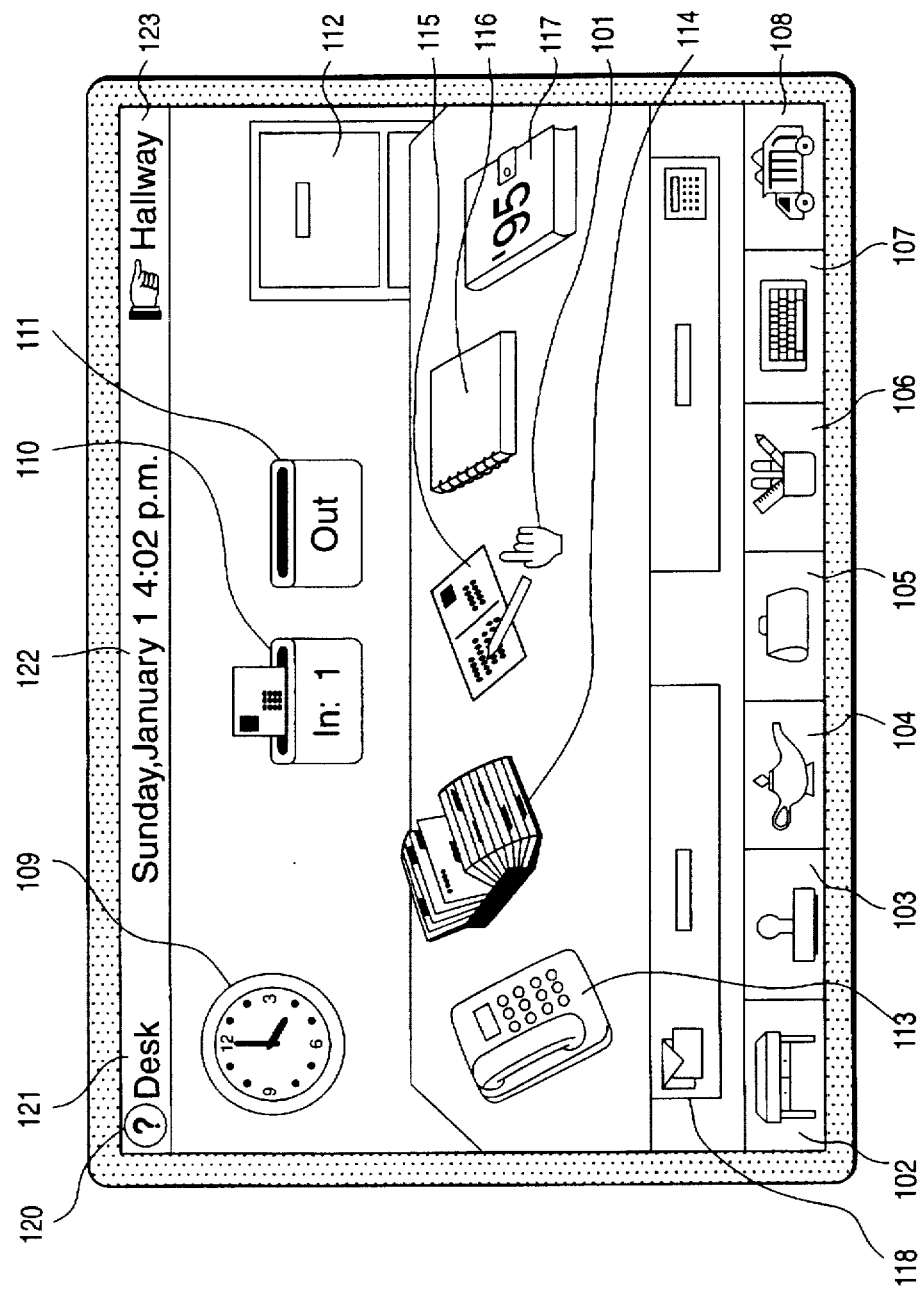
FIG. 9 is a schematic diagram illustrating an example of a GUI image displayed on the screen of a CRT of a monitor device.

The CPU 27 of the set top box 3 constructs bit map data on the VRAM 29 according to the program stored in the ROM 40 so as to provide a GUI (graphical user interface) on the display screen thereby providing a virtual office room as shown in FIG. 9. The display controller 28 converts the bit map data constructed on the VRAM 29 into a RIB signal and supplies the resultant signal to the video signal superimposing unit 24. The video signal superimposing unit 24 superimposes the RIB signal supplied by the display controller 28 on the RIB signal supplied by the video signal processing unit, and supplies the resultant signal to the monitor device 4 via the AV line 7. As a result, a GUI image is displayed on the CRT 5 as shown in FIG. 9.

The CPU 27 also constructs bit map data representing a finger-shaped pointing cursor 101 at a proper location of the VRAM 29 in such a manner that the pointing cursor data is superimposed on the bit map data representing the GUI image thereby displaying the pointing cursor 101 at a specified location superimposed on the GUI image on the screen of the CRT 5.

Various icons are displayed at an upper part of the GUI screen. These include a scene icon 121 for indicating the current scene, an information icon 120 for indicating the detailed information of the scene, an indicator for indicating the current date and time, and a goto icon 124 for designating a place the process should go to next.

In the central area of the screen representing the virtual office room, there are shown various icons including a clock icon 109 indicating the current time, an in-box icon 110 for indicating the number of electronic mails which have been received, an out-box icon 111 for indicating the number of electronic mails which are in a queue for transmission, a file cabinet icon 112 for storing or retrieving files, a telephone icon 113 for making a telephone call, a name card icon 114 for displaying name cards, a message icon 115 for producing a message to be transmitted by an electronic mail, a notebook icon 116 for controlling the displaying of a notebook, and a date book icon 117. Furthermore, a stationary icon 118 for controlling the usage of various stationeries is displayed on a drawer of a desk.

In a lower part of the GUI screen, another set of various icons is displayed, including a desk icon 102 used to come back to a desk from an arbitrary scene, a stamp icon 103 for using clip art, animation and sound, and for making a signature, a magic lamp icon 104 for designating various functions including retrieving, printing, electronic mail, facsimile transmission, and infrared communication, a bag icon 105 for storing and taking objects, a tool icon 106 for using various tools including a pen and eraser, a keyboard icon 107 for displaying a keyboard, and a trash icon 108 used to delete a selected file.

Figure 10:
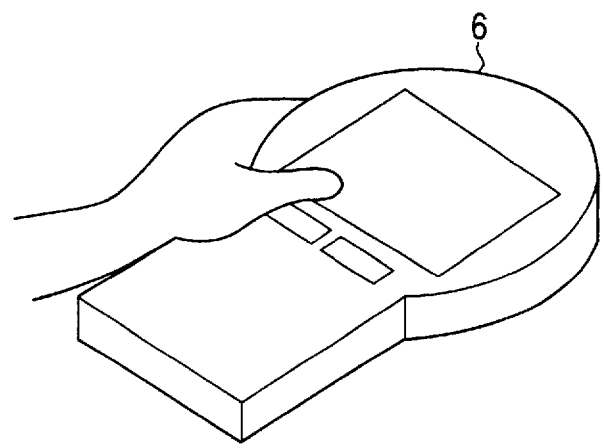
FIG. 10 is a schematic diagram illustrating the operation of the remote commander with a finger.

In step S21, a user selects a new mail. In this selection step, the user transmits a command to the set top box 3 by operating the remote commander 6 with a finger as shown in FIG. 10 so as to move the pointing cursor (finger cursor) 101 displayed on the screen to the message icon 115 simulating a post card displayed in the GUI image.

Figure 11:
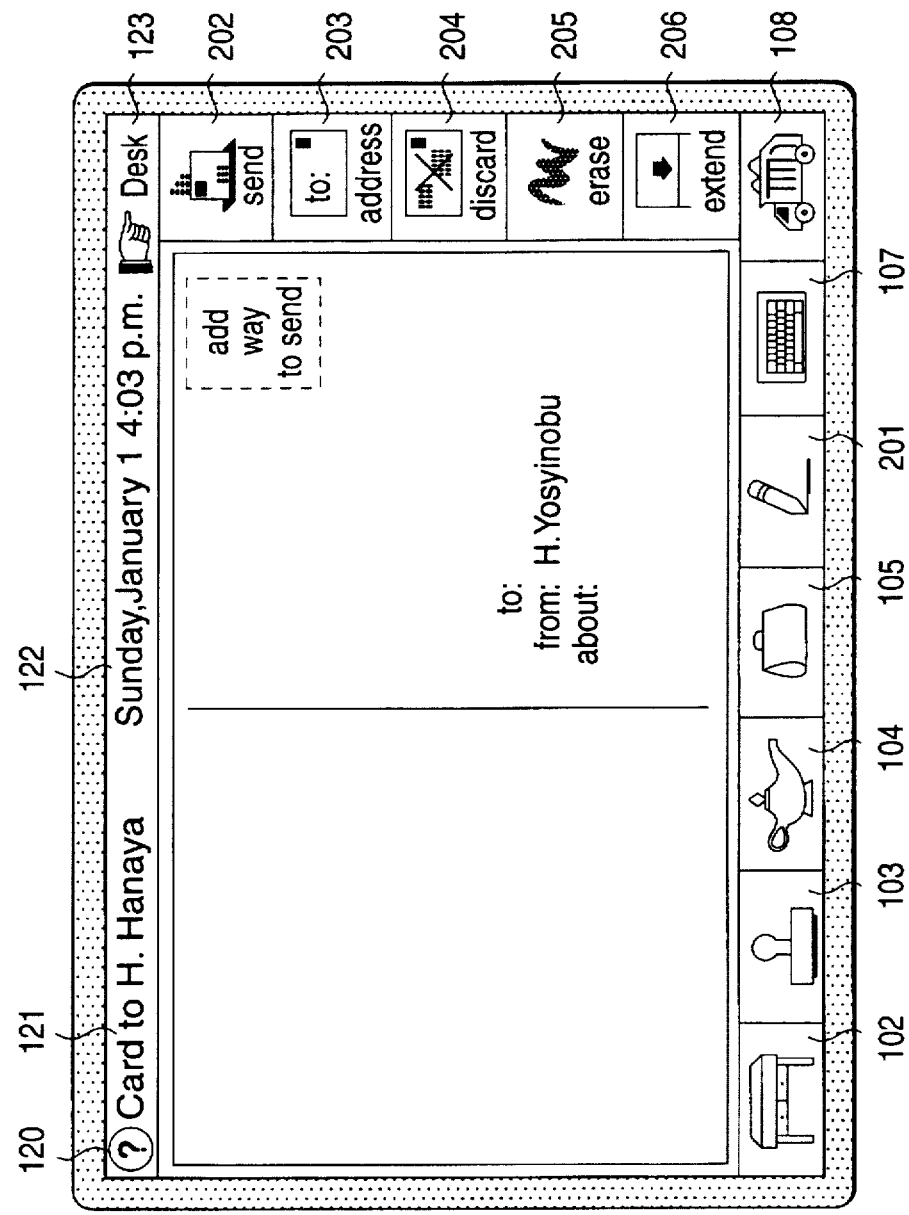
FIG. 11 is a schematic diagram illustrating an GUI image including an image of a post card on which the name of a sender is written.

When the pointing cursor 101 points to the message 115 after reaching the message icon 115, if the button 53 of the remote commander 6 is pressed or if the tablet 51 is tapped with a finger, then the message icon 115 is clicked and selected. If the message icon 115 is selected, a full size of image of a post card appears on the screen of the CRT 5 as shown in FIG. 11 wherein the address and the name of the user have been written automatically on the post card. Although it is not shown in FIG. 11, an image of an address book is also displayed in a superimposed fashion on the image of the post card.

Furthermore, there are also displayed various icons in a right end part of the screen, including a send icon 202 used to start transmission of an electronic mail, an address icon 203 used to designate the destination of the electronic mail, a discard icon 204 used to discard a produced card (post card), an erase icon 205 used to erase a written character or a drawn picture, and an extend icon 206.

Figure 12:
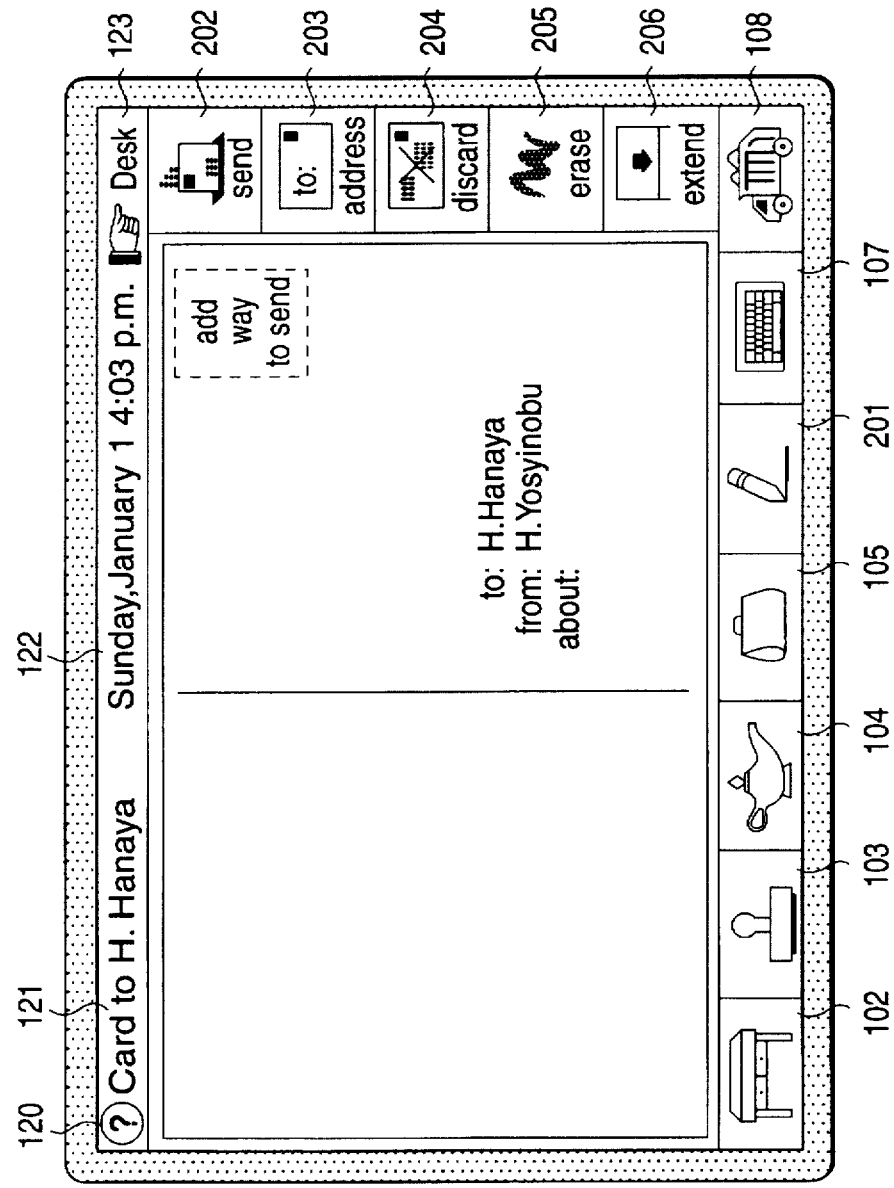
FIG. 12 is a schematic diagram illustrating a GUI image including an image of a post card on which the name of a destination is written.

Then in step S22, an index of the address book is selected using the pointing cursor 101, and the address of the destination is searched for. If the destination address is found, the address is selected using the pointing cursor 101. If the destination address is selected, the image of the address book disappears from the screen, and the selected destination name and address are written on the post card as shown in FIG. 12.

In step S23, the remote commander 6 is operated so as to move the pointing cursor 101 to an area of the post card image in which a text is to be written. If the above-described area is selected, an editor cursor 302 is displayed on the screen (FIG. 13) in addition to the pointing cursor 101, and a virtual keyboard 301 (FIG. 13) is also displayed in a predetermined area of the screen. A text is then input by properly selecting key icons of the virtual keyboard 301 using the pointing cursor 101. The input text is stored in the RAM 41.

Figure 13:
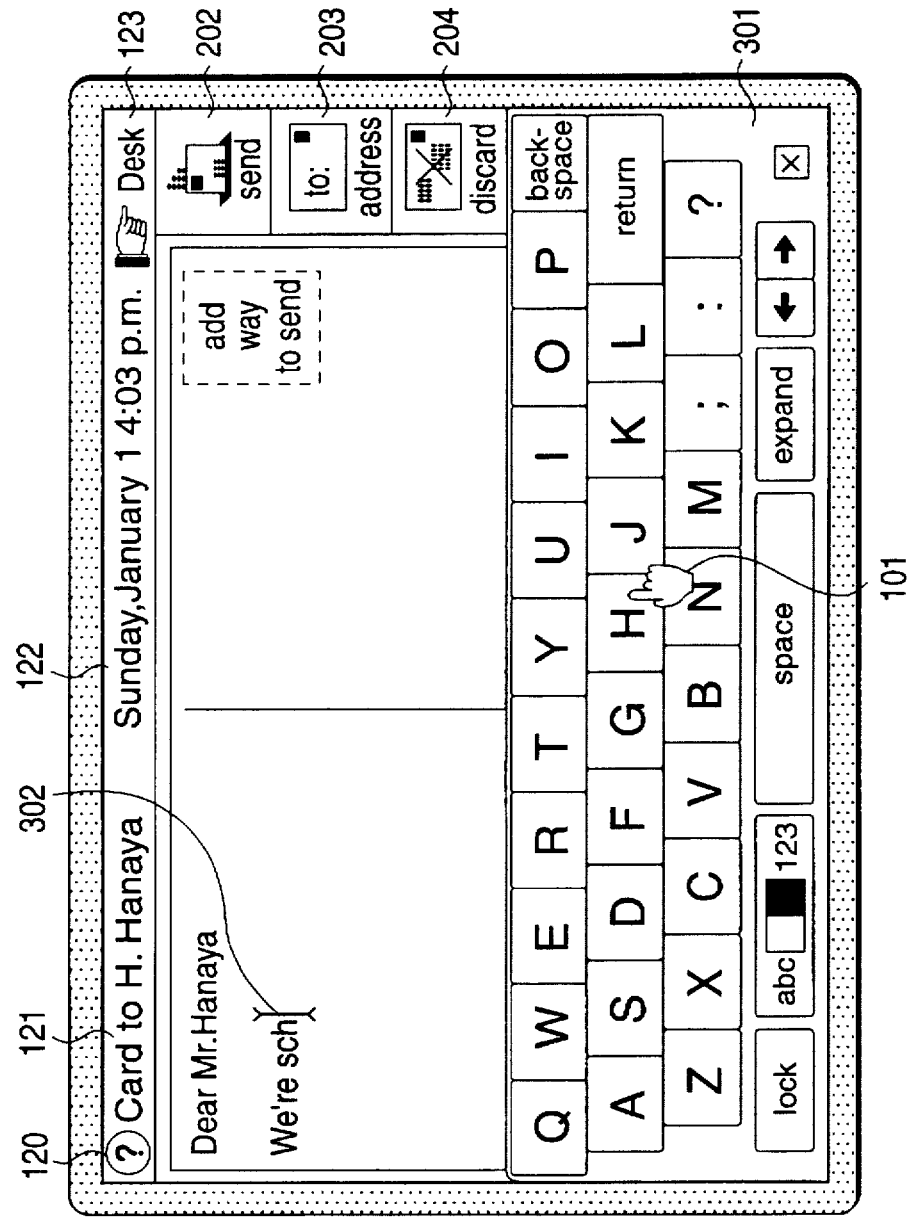
FIG. 13 is a schematic diagram illustrating an operation of inputting a text of the post card.

FIG. 13 illustrates an image in the middle of the operation of inputting a text. After completion of inputting the text, if a |X| icon displayed on the right side below the virtual keyboard is selected with the pointing cursor 101, the window of the virtual keyboard 301 is closed and the virtual keyboard 301 disappears from the screen.

Figure 14:
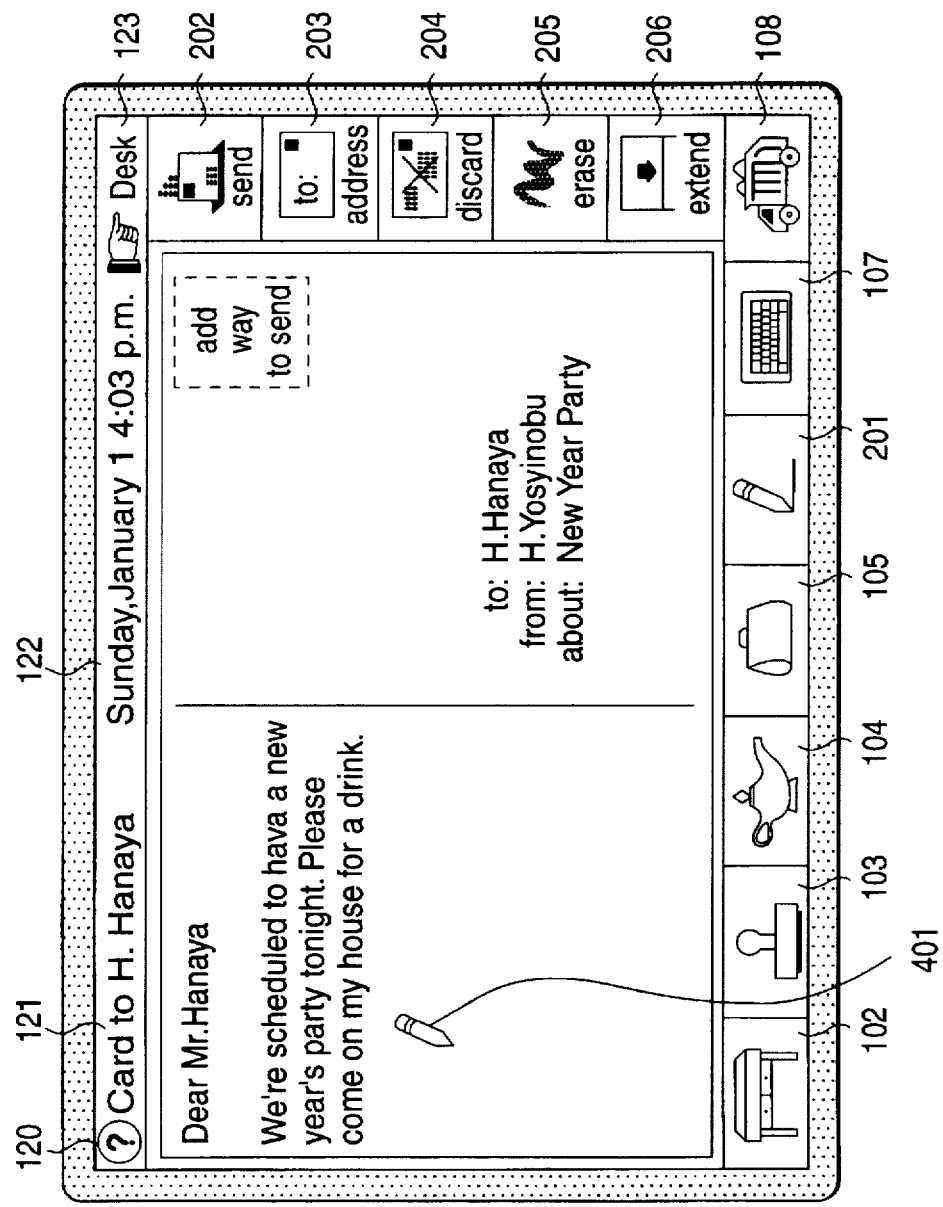
FIG. 14 is a schematic diagram illustrating a GUI image on which a pen cursor is superimposed.

Then the pointing cursor 101 is moved to an area in which a signature is to be written, and the area is selected by clicking it. Thus, the editing process is completed. If the pointing cursor 101 is then moved to the pen icon 201 and the pen icon 201 is clicked by operating the tablet 51 of the remote commander 6, a pen cursor 401 is displayed on the GUI screen as shown in FIG. 14.

Figure 15:
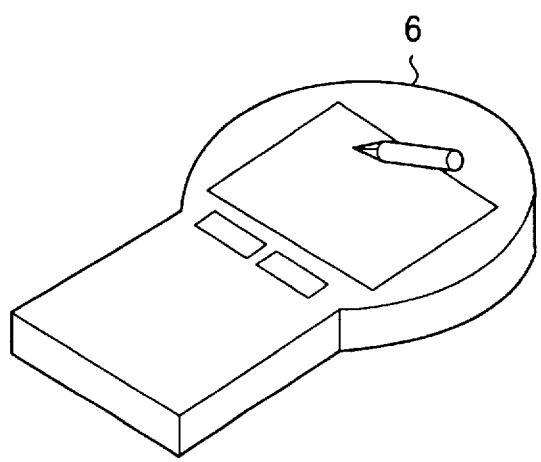
FIG. 15 is a schematic diagram illustrating an operation of the remote commander with a pen.
Figure 16:
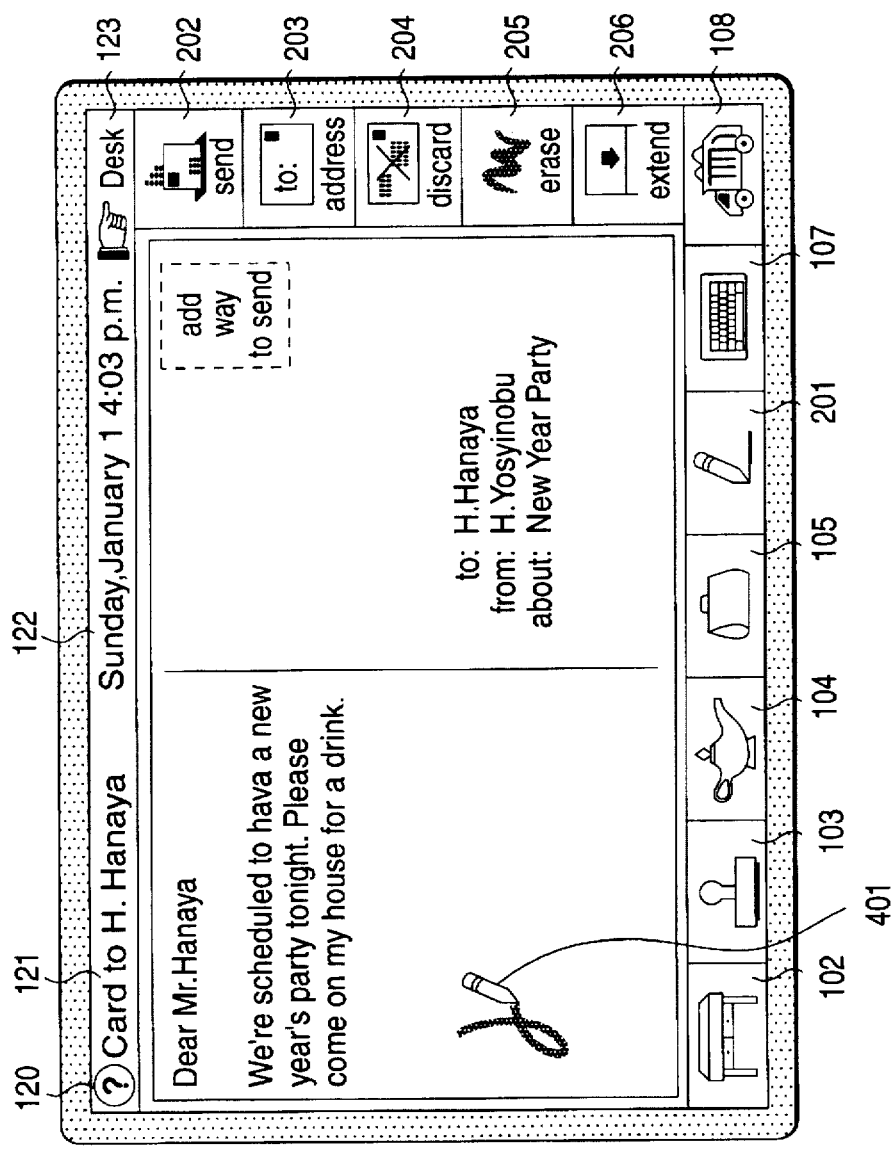
FIG. 16 is a schematic diagram illustrating a GUI image in which an operation of inputting a signature is being performed.

Then in step S24, the user writes a signature by operating the tablet 51 of the remote commander 6. In this step, the user touches a desired part of the tablet 51 of the remote commander 6 with a small tip of a pen or a fingernail as shown in FIG. 15. When the pen or the fingernail comes in contact with the tablet 51, the pen cursor 401 is displayed on the GUI screen of the monitor device 4, at a location corresponding to the pen location on the tablet 51 as shown in FIG. 14. Then if the pen is moved over the tablet 51, the pen cursor 401 moves on the screen in response to the motion of the pen as shown in FIG. 16 and thus the trace of the motion of the pen cursor 401 is displayed as a handwritten character on the GUI screen.

In the above operation, since the tablet 51 is operated with a small tip such as a pen or a fingernail, the absolute coordinates of the pen location or the fingernail location on the tablet 51 are detected by the detecting circuit 61 as described above with reference to the flow chart of FIG. 5. A signal corresponding to the detected absolute coordinates of the pen position or the fingernail position on the tablet 51 is supplied to the transmission module 65, which in turn frequency-modulates the received signal. The resultant signal is then transmitted in the form of a radio wave via the transmission antenna 66 to the set top box 3. The signal is received by the set top box 3, and an image signal corresponding to the received signal is supplied to the monitor device 4 via the AV line 7. Thus, an corresponding image is displayed on the CRT 5.

Figure 17:
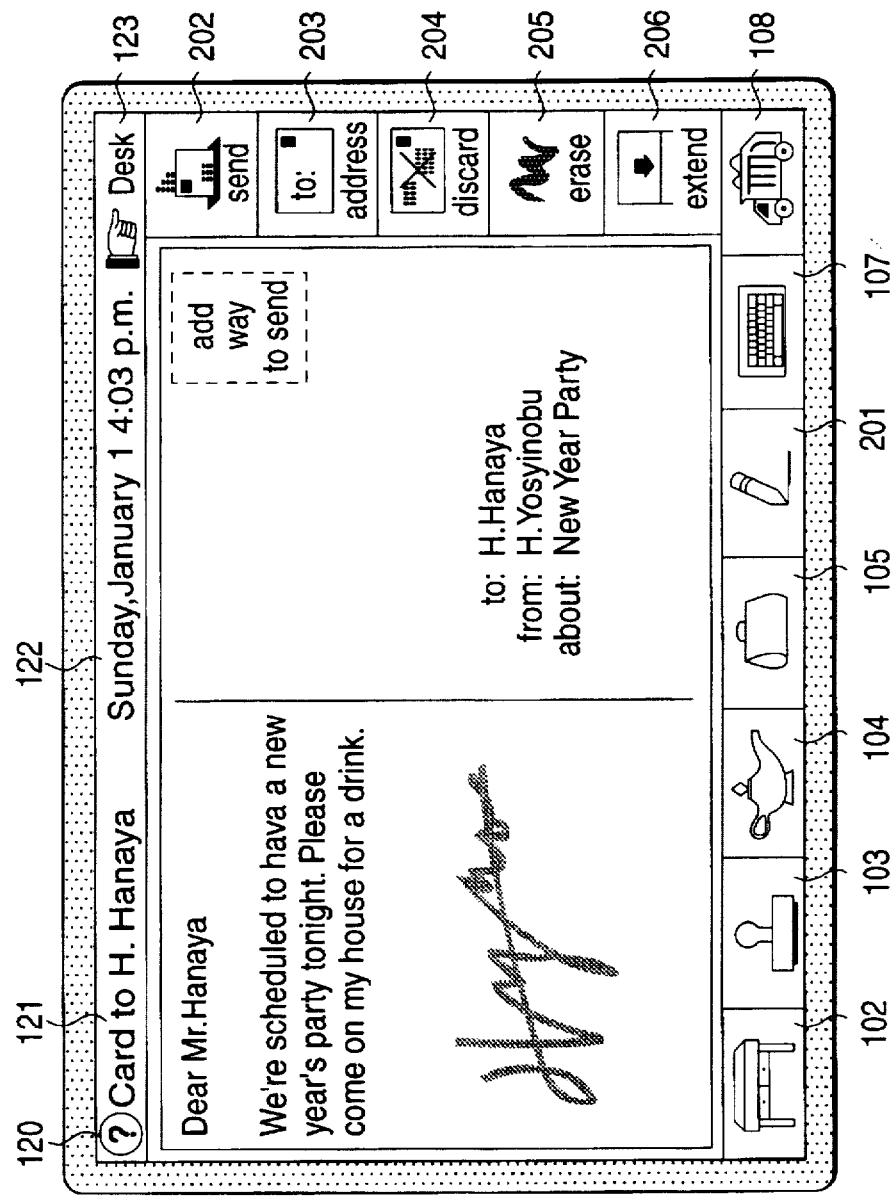
FIG. 17 is a schematic diagram illustrating a GUI image in which a complete signature has been input.

FIG. 17 illustrates a GUI image in which a signature has been input in the above-described manner.

As described above, during an operation of writing a signature, the pen cursor 401 on the GUI screen is moved to a location according to the absolute coordinates of the pen location of the fingernail location of the tablet 51, and thus a signature pattern similar to that formed on the tablet 51 is displayed on the GUI screen. Furthermore, if the signature area on the screen is set so that the ratio of the signature area size to the size of the tablet 51 is substantially 1:1, then it is possible to write a signature in a very natural manner although there is some parallax.

Furthermore, when the pen or fingernail has come within a predetermined range of distance to the tablet 51, a cursor having a shape other than the pen cursor 401 may be di s played on the screen and the pen cursor 401 may be displayed when the pen or fingernail has come in contact with the tablet 51. In this case, the user can know from the GUI screen where the finger or fingernail is located relative to the tablet 51. Therefore, the user can write by hand a signature or a character, or draw a picture at a desired location while keeping looking at the GUI screen.

After completion of the input of the signature, if the user operates the remote commander 6 with a finger so that the pointing cursor 101 moves to the send icon 202 at the top and right of the screen and the tablet 51 is tapped or the button 53 is pressed thereby clicking the send icon 202, then a command of transmitting the image of the post card, that is of transmitting the electronic mail, is issued to the set top box 3. Thus, the corresponding signal is transmitted in the form of a radio wave via the transmission antenna 66 of the remote commander 6.

The set top box 3 receives the radio wave signal via the receiver unit 35. A signal corresponding to the received signal is generated and supplied to the CPU 27 via the I/O 34 and the bus 42. Upon reception of the above signal, the CPU 27 commands the NCU 37 to make a connection via a telephone line 8 with a host computer (not shown) assigned as a device to receive electronic mail services. In response to the command issued by the CPU 27, the NCU 37 makes a connection via the telephone line 8 with the host computer assigned as the device to receive an electronic mail service.

If the connection via the telephone line to the host computer assigned as the device to receive the electronic mail service has been established, the data stored in the RAM 41 representing the text which has been input via the post card image, the name and address of the sender, and the name and address of the destination are converted by the CPU 27 into a predetermined format, and supplied to the modem 38 via the I/O 36. The modem 38 converts the signal supplied by the CPU 27 via the I/O 36 into an analog signal, and transmits the resultant analog signal via the telephone line 8 to the host computer assigned as the device to receive the electronic mail services.

Thus, the electronic mail is sent to the designated destination.

Furthermore, when a connection via the telephone line 8 with the host computer assigned as the device to receive the electronic mail services has established, if there are some mails addressed to the user in the host computer, the host computer transmits a signal indicating the presence of the mail. This signal is supplied to the CPU 27 via the NCU 37 and the modem 38. The control signal supplied by the host computer via the NCU 37 and the modem 38 lets the CPU 27 know that there are some electronic mails addressed to the user. The CPU 27 alters the shape of the in-box icon 110 on the GUI screen to a shape in which post cards are present and displays the number of electronic mails addressed to the user so that the user can immediately know that there are some electronic mails addressed to the user.

If the user moves the pointing cursor 101 to the in-box icon 110 by operating the remote commander 6 and selects the in-box icon 110 by clicking it, then the CPU 27 communicates with the host computer via the modem 38 and the NCU 37 and requests the host computer to send the electronic mails to the user. In response to the request, the host computer sends the electronic mails to the user via the telephone line 8.

The electronic mails sent from the host computer via the telephone line 8 is supplied to the CPU 27 via the NCU 37 and the modem 38. The CPU 27 constructs bit map data on the VRAM 29 corresponding to the image of the electronic mails including the text information, graphic information, and/or animation information supplied via the modem 38. Then the display controller 28 converts the bit map data constructed on the VRAM 29 into a corresponding RIB signal and supplies the resultant signal to the video signal superimposing unit 24. The video signal superimposing unit 24 superimposes the received signal on the RIB signal from the video signal processing unit 23, and sends the resultant signal to the video input terminal of the monitor device 4 so that the contents of the electronic mails are displayed on the screen of the CRT 5 of the monitor device 4.

If some electronic mail includes audio information, the CPU 27 supplies the audio data, included in the electronic mail supplied by the host computer via the NCU 37 and the modem 38, to the audio synthesizer 31 via the I/O 30. The audio synthesizer 31 synthesizes an audio signal corresponding to the audio data received via the I/O 30, and supplies the resultant signal to the audio signal mixer. The audio signal mixer 26 combines the received audio signal with the audio signal from the audio signal processing unit 25, and sends the resultant signal to the audio input terminal of the monitor device 4 so that the audio signal is output via a loudspeaker (not shown).

In the above example, an electronic mail is received via a telephone line 8. An electronic mail may also be received via a CATV cable 9. Alternatively, an electronic mail may be received by receiving a satellite broadcast transmitted by a broadcasting or communication satellite. In this case, a broadcasting radio wave from a satellite is received via the parabolic antenna 2, and converted to a corresponding signal. The resultant signal is supplied to the tuner 2. The tuner 2 selects a channel according to a command given by the CPU 27, and supplies the signal of the selected channel to the IF circuit 22. The IF circuit 22 converts the received signal to an intermediate frequency signal, and extracts video and audio signals. The video signal is supplied to the video signal processing unit 23, while the audio signal is supplied to the audio signal processing unit 25.

The video signal is amplified by the video signal processing unit 23, and the resultant signal is supplied to the video signal superimposing unit 24. The video signal superimposing unit 24 superimposes the received video signal on the RJB signal from the display controller 28, and sends the resultant signal to the video input terminal to the monitor device 4. On the other hand, the audio signal supplied to the audio signal processing unit 25 is amplified and output to the audio signal mixer 26. The audio signal mixer 26 combines the received audio signal with the audio signal from the audio synthesizer 31, and supplies the resultant signal to the audio input terminal of the monitor device 4.

As a result, text, graphic, and animation information constituting an electronic mail received via the satellite broadcast is displayed on the screen of the CRT 5, and a sound constituting the electronic mail is output by the loudspeaker.

In addition to electronic mails, agent services are also available. This can be performed in the basically same manner as the reception and transmission of electronic mails, and thus will not be described in further detail.

In the embodiments described above, the remote commander of the capacitance detection type is employed. Alternatively, other types based on for example electromagnetic induction detection or pressure detection may also be employed. In the case of the electromagnetic induction type, it is required to activate an electrostatic field with a tip and thus it is impossible to input a command with a finger. However, even in this case, it is possible switch the operation mode between the relative coordinate mode and the absolute coordinate mode by switching the type of pen with which is the tablet 51 is touched between for example a small pen tip disposed on one end of the pen and a rather large pen tip disposed on the other end.

In the embodiments described above, the remote commander 6 transmits a remote control signal in the form of a radio wave. Alternatively, an infrared ray may also be employed to carry a remote control signal. Furthermore, in addition to the set top box 3, the present invention may also be employed to remote-control various AV devices.

As described above, in the coordinate inputting apparatus and method according to the first aspect of the invention, the pressed position of the operation means pressed with a finger or pen and also the pressed area of the operation means pressed with the finger or pen are detected. The pressed area detected is compared with a reference value, and relative coordinate information corresponding to the movement of the pressed position or absolute coordinate information is output wherein where the relative coordinate information or the absolute information is output is determined depending on the comparison result described above. This arrangement of the invention makes it possible to output both the relative and absolute coordinate information using the same single apparatus wherein the switching between the relative and absolute coordinate information is performed automatically without user's switching operation.

In the information processing apparatus according to the second aspect of the invention, the pressed area of the operation means is compared with the reference value, and relative coordinate information or absolute coordinate information is transmitted depending on the comparison result. One of functions displayed on the display means is selected via the selection means on the basis of the received relative coordinate information corresponding to the movement of the pressed position. On the other hand, the processing means displays a character or a graphic pattern on the display means according to the absolute coordinate information received via the reception means. Thus, it is possible to select a function according to the relative coordinate information and also to draw a picture according to the absolute coordinate information. The picture drawing operation according to the absolute coordinate information is limited within an area of the display means. This allows the operation means to be realized in a rather small size and thus at a low cost.

What is claimed is:

1. A coordinate inputting apparatus for inputting a coordinate, said apparatus comprising:
   operation means which is operable with a finger or pen;
   position detecting means for detecting a position where said finger or pen contacts said operation means;
   area detecting means for detecting the area value of the contact area where said finger or pen contacts said operation means;
   comparison means for comparing said contact area value detected by said area detecting means with a predefined reference value; and
   output means for outputting relative coordinate information corresponding to said position detected by said position detecting means or absolute coordinate information corresponding to said position detected by said position detecting means according to the comparison result given by said comparison means, thereby automatically switching between said relative coordinate information and said absolute coordinate information on the basis of said comparison result.

2. A coordinate inputting apparatus according to claim 1, wherein said position detecting means detects said position by means of an electromagnetic induction detection mechanism, a capacitance detection mechanism, or a pressure detection mechanism.

3. A coordinate inputting apparatus according to claim 1, wherein said output means outputs said relative coordinate information when said contact area is larger than said predefined reference value as determined by said comparison means and outputs said absolute coordinate information when said contact area is smaller than said predefined reference value as determined by said comparison means.

4. A coordinate inputting apparatus according to claim 1, wherein said output means changes the ratio between a display area and an area provided by said operation means where said finger or pen contacts when said output means automatically selects between said relative coordinate information and said absolute coordinate information.

5. A coordinate inputting apparatus according to claim 4, wherein said output means sets said ratio substantially to 1:1 when outputting said absolute coordinate information.

6. A coordinate inputting apparatus according to claim 1, further comprising display means for displaying a cursor on a screen at a position corresponding to said position where said finger or pen contacts said operation means.

7. A coordinate inputting apparatus according to claim 6, further comprising means for changing the shape of said cursor displayed by said display means on said screen depending on the information output by said output means.

8. A coordinate inputting method of inputting a coordinate via operation means which is operable with a finger or a pen, said method comprising the steps of:

detecting a position where said finger or pen contacts said operation means;

detecting the area value of the contact area where said finger or pen contacts said operation means;

comparing said contact area value detected with a predefined reference value; and outputting relative coordinate information corresponding to said pressed position detected or absolute coordinate information corresponding to said position detected according to the comparison result performed in said comparison step, thereby automatically switching between said relative coordinate information and said absolute coordinate information on the basis of said comparison means.

9. A coordinate inputting method according to claim 8, wherein said detection of said position of the operation means is performed by means of an electromagnetic induction detection mechanism, a capacitance detection mechanism, or a pressure detection mechanism.

10. An information processing apparatus for performing a predetermined process according to a coordinate input, said apparatus comprising:

operation means which is operable with a finger or pen;

position detecting means for detecting a position where said finger or pen contacts said operation means;

area detecting means for detecting the area value of the contact area where said finger or pen contacts said operation means;

comparison means for comparing said contact area value detected by said area detecting means with a predefined reference value;

output means for outputting relative coordinate information corresponding of said position detected by said position detecting means or absolute coordinate information corresponding to said position detected by said position detecting means according to the comparison result given by said comparison means, thereby automatically switching between said relative coordinate information and said absolute coordinate information on the basis of said comparison result;

transmission means for transmitting said relative coordinate information or absolute coordinate information given by said output means;

reception means for receiving said relative coordinate information or absolute coordinate information transmitted by said transmission means;

display means for displaying characters, graphic patterns, or icons corresponding to predefined functions;

selection means for selecting one of said functions displayed on said display means on the basis of the relative coordinate information received via said reception means; and processing means for displaying a predefined character or graphic pattern on said display means according to said absolute coordinate information received via said reception means.

11. An information processing apparatus according to claim 10 wherein said position detecting means detects said position by means of an electromagnetic induction detection mechanism, a capacitance detection mechanism, or a pressure detection mechanism.

* * * * *